(12) United States Patent
Singh

(10) Patent No.: US 12,235,411 B2
(45) Date of Patent: Feb. 25, 2025

(54) MIRROR REPLACEMENT SYSTEM

(71) Applicant: Orlaco Products B.V., Barneveld (NL)

(72) Inventor: Mandeep Singh, Delft (NL)

(73) Assignee: Orlaco Products, B.V. (NL)

( * ) Notice: Subject to any disclaimer, the term of this patent is extended or adjusted under 35 U.S.C. 154(b) by 602 days.

(21) Appl. No.: 17/541,769

(22) Filed: Dec. 3, 2021

(65) Prior Publication Data

US 2022/0196885 A1  Jun. 23, 2022

Related U.S. Application Data

(60) Provisional application No. 63/127,592, filed on Dec. 18, 2020.

(51) Int. Cl.
| | | |
|---|---|---|
| *G02B 1/18* | (2015.01) | |
| *B60R 11/04* | (2006.01) | |
| *G02B 1/115* | (2015.01) | |
| *H04N 23/50* | (2023.01) | |
| *H05B 3/14* | (2006.01) | |
| *H05B 3/84* | (2006.01) | |

(52) U.S. Cl.
CPC .............. *G02B 1/18* (2015.01); *B60R 11/04* (2013.01); *G02B 1/115* (2013.01); *H04N 23/50* (2023.01); *H05B 3/141* (2013.01); *H05B 3/84* (2013.01); *G02B 2207/101* (2013.01); *H05B 2203/013* (2013.01); *H05B 2203/016* (2013.01)

(58) Field of Classification Search
CPC .... G02B 1/18; G02B 1/115; G02B 2207/101; G02B 1/16; G02B 1/118
See application file for complete search history.

(56) References Cited

U.S. PATENT DOCUMENTS

| | | |
|---|---|---|
| 2011/0281068 A1 | 11/2011 | David et al. |
| 2018/0018939 A1 | 1/2018 | Choi et al. |
| 2019/0137723 A1 | 5/2019 | Bernal et al. |
| 2020/0064520 A1* | 2/2020 | Xiao ................. B32B 9/007 |
| 2020/0139934 A1 | 5/2020 | Hein et al. |

OTHER PUBLICATIONS

International Preliminary Report on Patentability for International Application No. PCT/EP2021/086264 mailed Jun. 29, 2023.
International Search Report and Written Opinion for International Patent Application No. PCT/EP2021/086264 mailed on Apr. 5, 2022.

* cited by examiner

*Primary Examiner* — Joseph P Martinez
(74) *Attorney, Agent, or Firm* — Carlson, Gaskey & Olds, P.C.

(57) ABSTRACT

A mirror replacement system includes a camera having a frontal lens on an outer surface of the camera. The frontal lens includes an inner surface and an outer surface. A nano-etched coating is deposited on at least one of the inner and outer surfaces of the lens.

14 Claims, 4 Drawing Sheets

MIRROR REPLACEMENT SYSTEM

CROSS-REFERENCE TO RELATED APPLICATION

This application claims priority to U.S. Provisional Patent Application No. 63/127,592 filed on Dec. 18, 2020.

TECHNICAL FIELD

This disclosure is directed generally to mirror replacement systems for vehicles, and more specifically to a camera for utilization in mirror replacement systems.

BACKGROUND

Mirror replacement systems can improve the operation of vehicles by replacing the mirrors using camera systems having integrated, digital, high-definition (HD) cameras and digital monitors. The camera systems provide improved maneuverability in many traffic situations and/or conditions.

Mirror replacement systems often include camera systems that utilize a frontal lens element on an outer surface of the camera. However, the frontal lens element is exposed to the outside environment and may experience condensation or frosting or icing, ultimately obscuring or degrading visual capabilities. Importantly, maintaining the maximum possible optical transmission through the optical system in all weather conditions is paramount. In addition, preventing moisture and frost or ice formation by applying a low spectral emissivity coating as the outermost layer on the lens will improve the imaging and functional safety characteristics of the system.

Further details of the present disclosure will be apparent from the detailed description and figures included below.

SUMMARY OF THE INVENTION

In one exemplary embodiment a mirror replacement system includes a camera having a frontal lens on an outer surface of the camera, the frontal lens including an inner surface and an outer surface, and a nano-etched coating deposited on at least one of the inner and outer surfaces of the lens.

In another example of the above described mirror replacement system the nano-etched coating is a transparent conductive oxide (TCO) coating.

In another example of any of the above described mirror replacement systems the transparent conductive oxide (TCO) coating is selected from the group consisting of indium tin oxide (ITO), aluminum-doped zinc oxide (AZO), and fluorine-doped tin oxide (FTO).

In another example of any of the above described mirror replacement systems the TCO coating include one of a random nanostructure and a moth-eye nanostructure In another example of any of the above described mirror replacement systems the TCO coating is conductive and has an emissivity value in the range 0.05 to 0.2.

In another example of any of the above described mirror replacement systems one or both TCO coatings on the outer- and underside of the frontal lens is connected to a power source such as electrical connection pads.

In another example of any of the above described mirror replacement systems the TCO coating is a resistive heater.

Another example of any of the above described mirror replacement systems further includes a multilayered anti-reflective (AR) coating deposited on the inner surface of lens.

In another example of any of the above described mirror replacement systems the TCO coating is deposited on the multilayered AR coating applied to the inner surface of the frontal lens.

In another example of any of the above described mirror replacement systems each layer of the multilayered AR coating is numerically designed prior to fabrication using a characteristic matrix (CM) method to include the optical properties of the TCO to optimally suppress light reflection In another example of any of the above described mirror replacement systems each layer of the multilayered AR coating is selected from silica and the group consisting of metal oxides: tantala, titania, hafnia, niobia, alumina, aluminum oxynitride and mixtures thereof.

An exemplary method of reducing at least one of broadband reflection and emissivity of a mirror replacement system, the method includes depositing a nano-etched coating on at least one of an inner surface and an outer surface of a frontal lens element, and arranging one or more cameras on a mirror replacement system of a vehicle, each respective camera including the frontal lens.

Another example of the above described method of reducing at least one of broadband reflection of a mirror replacement system further includes disposing a multilayered anti-reflective (AR) coating on the inner surface of an outer lens element, optimizing each layer of the multilayered AR coating using a characteristic matrix (CM) method to include TCO optical properties, disposing the nano-etched coating on at least one of an inner surface of the multilayered AR coating and the inner surface of the lens, and designing the nano-etched surface for hydrophobicity or treating the nano-etched coating such that hydrophobicity is increasing the hydrophobicity of the nano-etched surface through one of a designed structural feature of the nano-etched surface and a treatment to the nano-etched surface.

In another example of any of the above descried methods of reducing at least one of broadband reflection of a mirror replacement system the nano-etched coating includes a random nanostructure.

In another example of any of the above descried methods of reducing at least one of broadband reflection of a mirror replacement system the TCO coated layer includes moth-eye structures.

In another example of any of the above descried methods of reducing at least one of broadband reflection of a mirror replacement system the nano-etched coating includes a conductive nano-etched coating that is connected to a power source such that the nano-etched coating is a resistive heater.

In one exemplary embodiment a vehicle including a mirror replacement system including a camera, the camera having a frontal lens on an outer surface of the camera, the frontal lens element including an inner surface and an outer surface, and a nano-etched coating deposited on at least one of the inner and outer surfaces of the lens element.

In another example of the above described vehicle including a mirror replacement system the nano-etched coating has one of a random nanostructure and moth-eye structures, and the nano-etched coating is conductive.

In another example of any of the above described vehicles including a mirror replacement system the nano-etched coating is connected to a power source such that the nano-etched coating is a resistive heater.

Another example of any of the above described vehicles including a mirror replacement system further includes a multilayered anti-reflective (AR) coating is deposited on the inner surface of lens

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
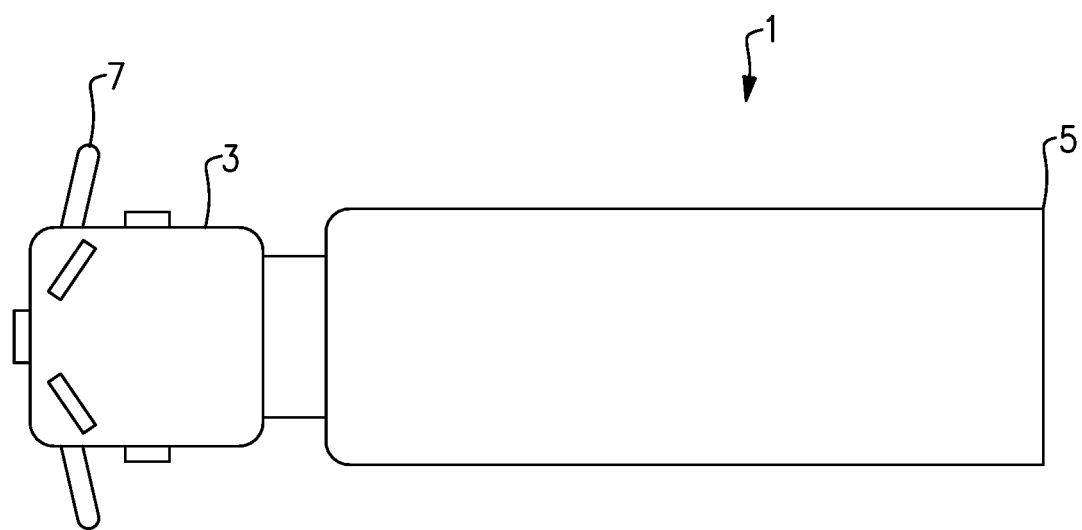
FIG. 1 schematically illustrates a perspective view of an example vehicle.

FIG. 1 illustrates an example vehicle 1. In this example, the vehicle includes a cabin 3, a trailer 5 and a mirror system 7. Although the example vehicle 1 is shown generally as a commercial vehicle, the vehicle 1 could be any other vehicle incorporating the mirror system described herein.

The mirror system 7 is positioned on the outside of the vehicle 1 and is oriented such that the environment outside the vehicle 1 is visible to a user. In the example vehicle, the mirror system 7 is rear- and/or side-facing and provides a mirror replacement for a conventional rear-view mirror.

Figure 2:
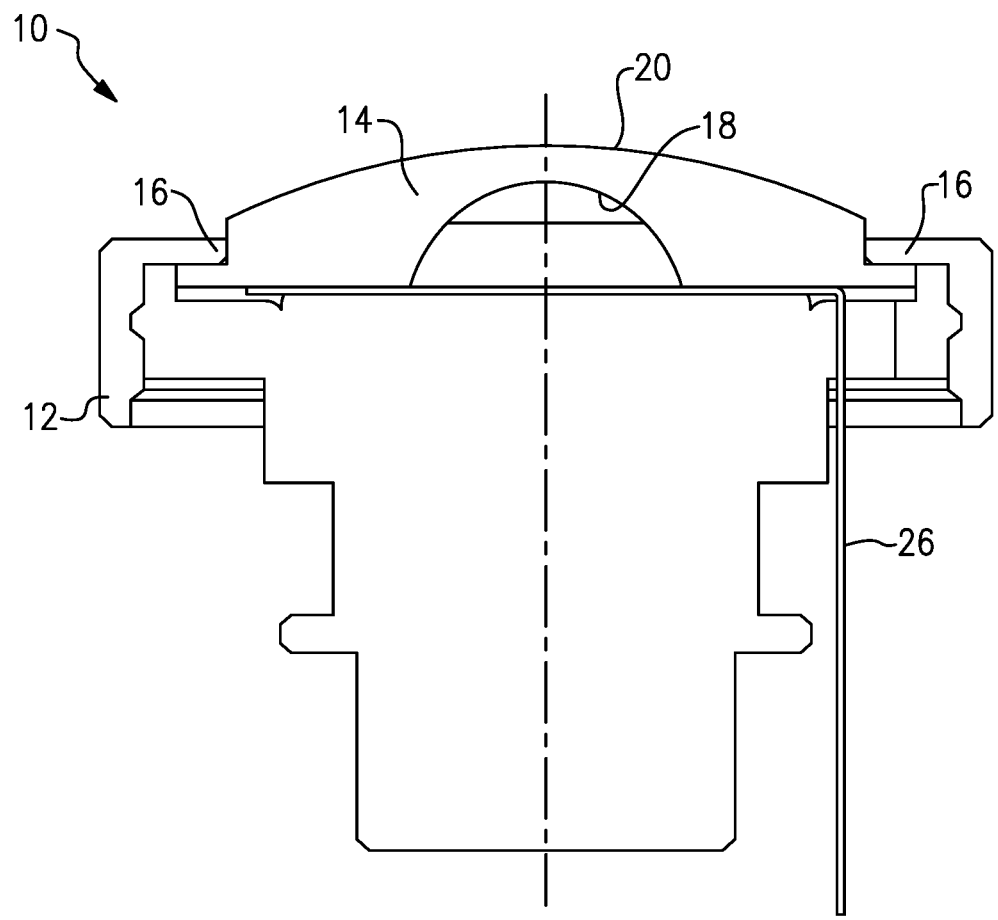
FIG. 2 schematically illustrates a sectional view of typical lens (objective) incorporated in a camera of the mirror replacement system.

FIG. 2 illustrates a sectional view of a camera system 10 of the mirror system 7. The camera system 10 has a housing 12 that includes a frontal lens element 14. The frontal lens element 14 is coupled to the housing 12. A sealing member 16 is provided to prevent moisture from penetrating through the frontal lens element 14. The frontal lens element 14 includes an inner surface 18 and an outer surface 20. The outer surface 20 is exposed to the outside environment under normal operating conditions.

Figure 3:
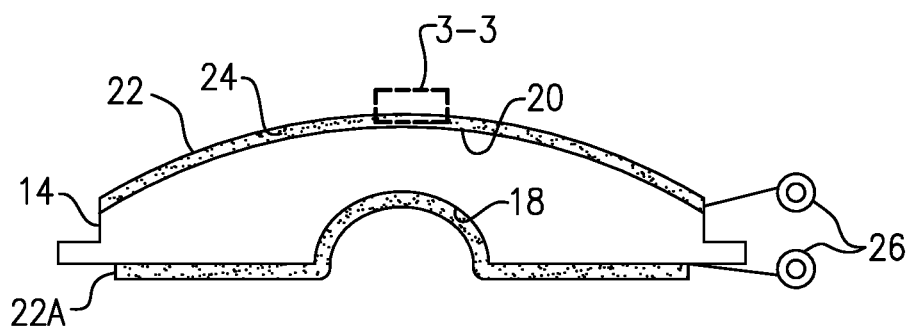
FIG. 3 schematically illustrates aspects of the frontal lens of FIG. 2.

Referring to FIG. 3, the frontal lens element 14 in one example includes a coating 22 and 22A. In this illustrative example, the coating 22 is deposited along the inner surface 18 and the coating 22A is deposited along the outer surface 20. In another example, the coating 22 is not deposited on the inner surface 18 (shown as dashed lines for illustrative purposes).

The coating 22 can be made of a transparent conductive oxide (TCO) thin film. TCOs are a class of semiconducting thin films that have an optical band-edge typically in the ultraviolet (UV) spectral region, thereby making them optically transparent in the visible and near-infrared regions. In addition, doping these semiconducting films with appropriate dopant elements, makes the films electrically conductive, usually of n-type conduction. The conductivity is in the range appropriate for ohmic heating of the film upon applying a voltage. Furthermore, the high charge carrier concentration imparts in the films the radiative property of low emissivity with a concomitant high reflectivity in the infrared spectral wavelength region. TCOs can therefore be coated on optical elements such as those in imaging devices, e.g. cameras, and also laser scanning detection and ranging system, e.g. LiDAR, both operating variously in the visible and near-infrared spectral regions, without significantly reducing the amount of light collected by the imaging optics.

Accordingly, TCOs are advantageous at preventing or reducing frost and ice formation due to their inherent property of low emissivity TCOs are inherently hydrophilic materials. However, chemical treatment, including nano-structure patterning of these and doping some materials with fluorine, can produce TCOs with hydrophobic characteristics. For example, the coatings 22, 22A may be nano-etched in a motheye-type pattern to provide a hydrophobic surface that minimizes water droplet formation, retention, and adherence, while also imparting anti-reflective characteristics to the layer, thereby reducing broadband light reflection to maximize light transmission in the camera. The pattern may be printed in a temporarily photo-resistive layer using a lithographic processing method and thereafter etched in. Etching is a standard fabrication method of selectively removing part of the surface of the coatings 22, 22A to reveal the microstructure, which creates a contrast between different regions of the TCO coating 22 through differences in topography. In one example, etching can be achieved using a plasma etching process. The differences in topography are numerically designed to reduce the reflectivity of the surface while maintaining the property of low emissivity for frost or ice formation. In this example, the emissivity has a value in the range 0.05 to 0.2. Nano-etching (etching of patterns in the 1 nm to 100 nm range) can be achieved, in some examples, using wet-etching or, more likely, plasma (dry)-etching. In the illustrated example, an outer surface 24 of the coating 22A is nano-etched such that the coating 22A provides a multi-functional layer in which anti-reflective properties, low emissivity properties, and hydrophobic properties are achieved in a single layer.

In one example, the coatings 22, 22A can be indium tin oxide (ITO), aluminum-doped zinc oxide (AZO), or fluorine-doped tin oxide (FTO). Material selection of the coatings 22, 22A serves to provide a sealing coat to the frontal lens 14, a bond or environmental barrier coating with one or more layers to protect the frontal lens element 14 from chemical attack and erosion through abrasion, usually a result of fast airflow and environmental particle pollution. The coatings 22, 22A will also function as a frost-prevention coating when designed and fabricated as described above.

As shown in FIG. 3 with continued reference to FIG. 2, the coating 22A on the inner surface 18 of lens element 14 is connected to an electric power source through an electrical connector 26 such that the coating 22A acts as a resistive heater when power is applied. In some examples, an additional or alternative electrical connection 26 in the form of a pad is provided between the frontal lens element 14 and the coating 22. The power source 26 aids in removing frost or ice from the frontal lens element 14 by distributing heat along the outer surface 24 of the coating 22A through conductive heat transfer through lens element 14. In one example, the electrical connection between the frontal lens element 14 and the coating 22 allows the coating 22 to operate as a two-wire thermistor, whereby the temperature of 14 may be monitored periodically and heated if necessary to preemptively prevent frost or ice accumulation.

Figure 4:
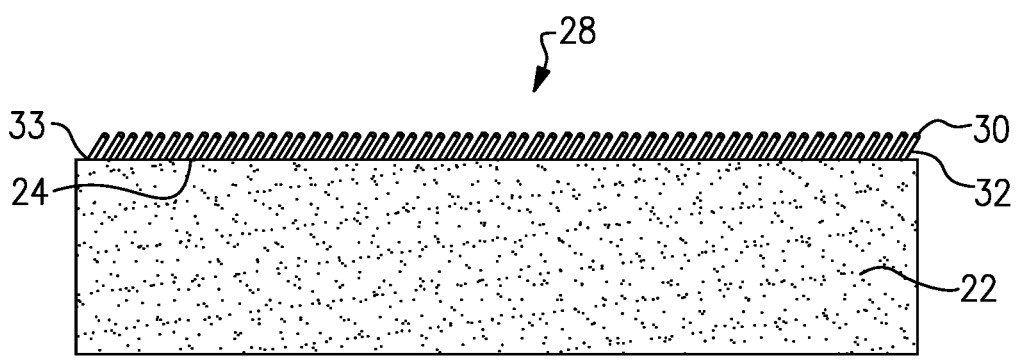
FIG. 4 schematically illustrates a sectional view taken along line 3-3 of FIG. 3.
Figure 5:
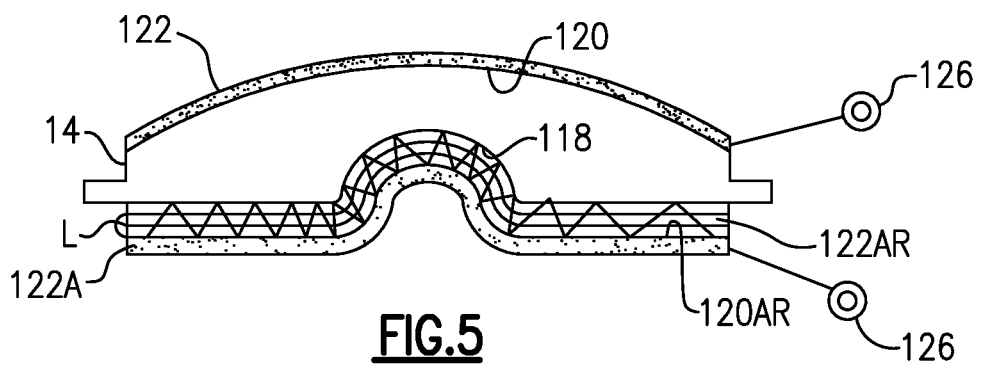
FIG. 5 schematically illustrates a frontal lens according to another example.

Referring to FIG. 4, with continuing reference to FIG. 3, the outer surface 24 of the coating 22A is structured such that there is a contrast between the outer surface 24 topography and the coating 22A topography. In this example, the outer surface 24 is nanostructured as a random anti-reflective sub-layer or as moth-eye structures 28, according to design specification and the level of abrasion resistance required. The nano-structures 28 include an eye portion 30 and a stem portion 32. The stem portion 32 establishes a change in structure between the eye portion 30 and the outer surface 24. In some example, the nano-structures 28 will have dimensions far less than the incidence of light and thus, form a region of graded refractive index 33 at the interface between the outer surface 24 and the outside environment, giving the anti-reflective property FIG. 5 illustrates a frontal lens 114 according to another example. Similarly, the frontal lens 114 includes an inner surface 118 and an outer surface 120. A coating 122A is deposited on the outer surface 120. An anti-reflective (AR) coating 122AR is deposited on the inner surface 118. In addition, a coating 122A is deposited on an inner surface 120AR of the AR coating 122AR (shown as dashed lines in FIG. 5 for illustrative purposes). In other examples, the frontal lens 114 selectively includes either the coating 122 on the inner surface 118 or the AR coating 122AR on the inner surface 118. As shown, the frontal lens 114 also includes an electrical connector 126 that is connected to the coating 122A and an additional or alternative electrical connection 126 that is connected to the coating 122.

The AR coating 122AR includes multiple layers L. Each of the layers L are numerically optimized using a characteristic matrix (CM) method. The CM method includes one dimensional rigorous electromagnetic field calculations. The product of each of the layer matrix includes incident electric field amplitude at each interface between layers L. In one example, the AR coating 122AR includes eight layers, thus enabling broadband spectral response from 450-850 nm of T>99.5%. Increasing the number of layers L results in steeper roll-off and decreased T. The CM method enables operable transmission, reflectance, and absorptance properties of the camera system 10. The product of the CM method is in accordance with the coating 122, the topography of the coating 122, and the thickness of the coating 122 required for particular design applications.

Typically, the surface reflectance averaged over the spectral region of interest may be reduced to less than 0.5%, even to <0.1%, depending on AR coating 122AR design specifications. The design methods employed are phenomenologically identical to impedance matching methods for maximum power transmission in electrical systems. The layer L may number from 1 to 20 depending on the application and the specifications, and are typically deposited in vacuum systems with the optical elements mounted in the chamber in their dozens or hundreds to reduce production costs.

The layers L can be made of various materials depending on the needs of a given implementation. In some examples, the layers L will include silica, and one or more from a group of metal oxides comprising: tantala, titania, hafnia, niobia, alumina, aluminum oxynitride and mixtures thereof.

Figure 6:
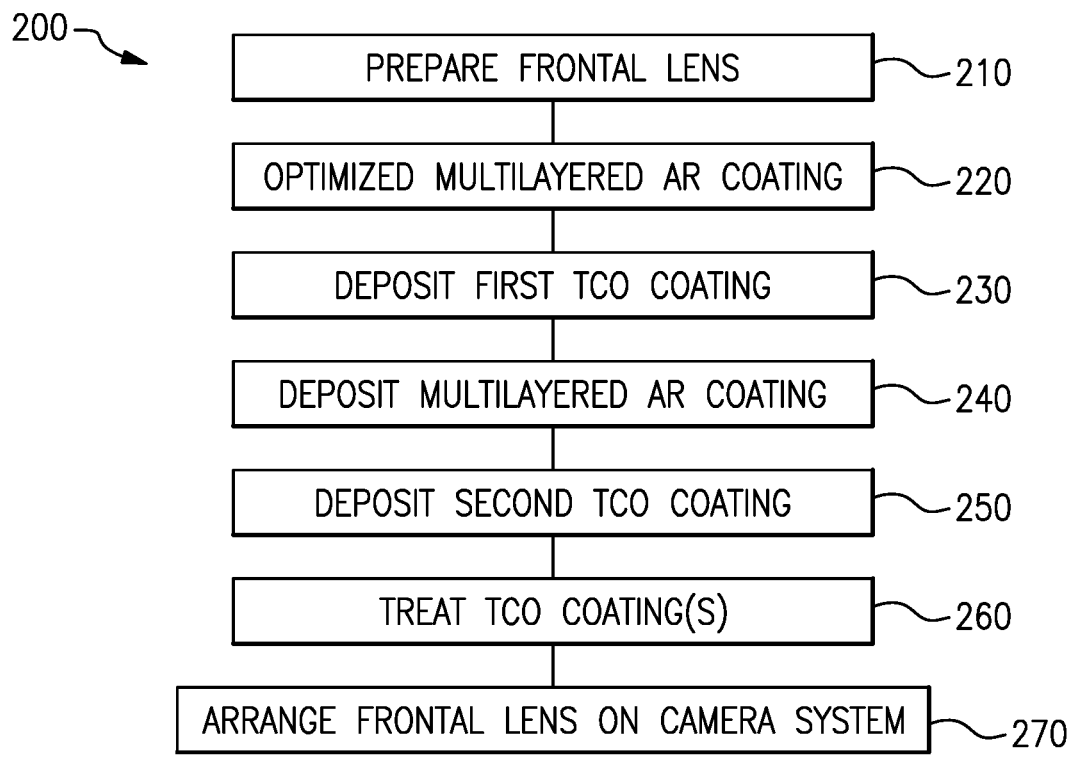
FIG. 6 illustrates a method of reducing both broadband reflection and emissivity of a mirror replacement system.

FIG. 6 is a flowchart illustrating a method 200 of reducing both broadband reflection and emissivity of mirror replacement systems, such as the mirror replacement system element 10.

At step 210, the outer surface of the lens 214 is prepared using any known optical fabrication method. The preparation in step 210 corrects the shape of the outer surface of the lens 214. At step 220, each layer of a multilayered anti-reflective (AR) coating is optimized using the CM method. At step 230, a first TCO coating is deposited on at least one of an inner and outer surface of the lens 214. At step 240, the multilayered AR coating is deposited on the inner surface of lens 214. At step 250, a second TCO coating is deposited on an outer surface of the multilayered AR coating. The deposition of the TCO coating and the multilayered AR coating can be achieved using evaporation, ion-assisted deposition, plasma sputtering, ion-beam sputtering, atomic layer deposition, chemical vapor deposition, and combination thereof. Regarding the multilayered AR coating, the choice of deposition method is restricted by the number of multilayer AR coating layers, physical and thermal characteristics of the substrate and deposition materials, and cost. At step 260, the TCO coatings can be structured (e.g., moth-eye structuring) and chemically treated to improve hydrophobic properties. It is contemplated that in the case of the tin oxide the hydrophobic surface treatment compounds may include alkyl-silanes and alkyl-tin. At step 270, the lens 214 is assembled on one or more camera systems that are arranged on a mirror replacement system of a vehicle. The lens 214 includes an inner and an outer surface that are optically aligned and tested for optical performance. In some examples, the lens 214 is a 360° view lens.

The mirror replacement systems disclosed herein can be used in vehicle applications. Vehicular optical systems (e.g., cameras) are increasingly subjected to harsh outside environments (e.g., thermal stress, high humidity, corrosion, and abrasion). Providing the coatings 22, 122 helps maintain optical performance independent of environment factors, act as a barrier to moisture or chemical attack, be hydrophobic/hydrophilic, and be mechanically robust against thermal cycling and transients.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A mirror replacement system comprising:
    a camera having:
        a frontal lens on an outer surface of the camera, the frontal lens including an inner surface and an outer surface;
        a nano-etched coating deposited on the inner surface, wherein the nano-etched coating is a transparent conductive oxide (TCO) coating; and
        a multilayered anti-reflective (AR) coating deposited on the inner surface of lens.

2. The mirror replacement system as recited in claim 1, wherein the transparent conductive oxide (TCO) coating is selected from the group consisting of indium tin oxide (ITO), aluminum-doped zinc oxide (AZO), and fluorine-doped tin oxide (FTO).

3. The mirror replacement system as recited in claim 1, wherein the TCO coating includes one of a random nanostructure and a moth-eye nanostructure.

4. The mirror replacement system as recited in claim 1, wherein the TCO coating is conductive and has an emissivity value in the range 0.05 to 0.2.

5. The mirror replacement system as recited in claim 4, wherein the TCO coatings is connected to electrical connection pads.

6. The mirror replacement system as recited in claim 5, wherein the TCO coating is a resistive heater.

7. The mirror replacement system as recited in claim 1, wherein the TCO coating is deposited on the multilayered AR coating.

8. The mirror replacement system as recited in claim 1, wherein each layer of the multilayered AR coating is configured to suppress light reflection at a wavelength that is different from an adjacent layer of the multilayered coating.

9. The mirror replacement system as recited in claim 1, wherein each layer of the multilayered AR coating is selected from silica and the group consisting of metal oxides: tantala, titania, hafnia, niobia, alumina, aluminum oxynitride and mixtures thereof.

10. A method of reducing at least one of broadband reflection and emissivity of a mirror replacement system, the method comprising:

depositing a nano-etched coating on an outer surface of a frontal lens element, wherein the nano-etched surface provides hydrophobicity;

disposing a multilayered anti-reflective (AR) coating on an inner surface of the frontal lens element, wherein each layer of the multilayered AR coating is optimized using a characteristic matrix (CM) method to include transparent conductive oxide (TCO) optical properties, wherein each layer of the multilayered AR coating is configured to suppress light reflection at a wavelength that is different from an adjacent layer of the multilayered coating.

11. The method as recited in claim 10, the method further comprising:

arranging one or more cameras on a mirror replacement system of a vehicle, each respective camera including the frontal lens.

12. The method as recited in claim 10, wherein the nano-etched coating is a TCO coating that includes a random nanostructure.

13. The method as recited in claim 12, wherein the TCO coating includes moth-eye structures.

14. The method as recited in claim 10, wherein the TCO coating is connected to a power source such that the nano-etched coating is configured to provide a resistive heater.

* * * * *